J. Liming,
Jaw Trap,
N° 41,012. Patented Dec. 22, 1863.
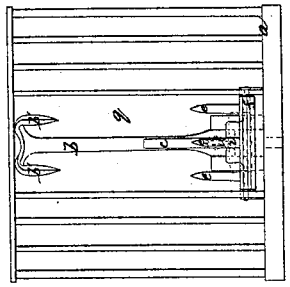
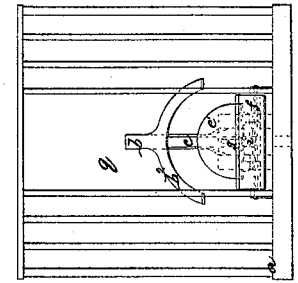
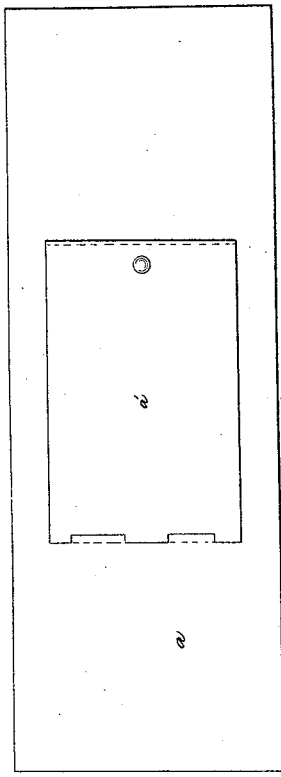
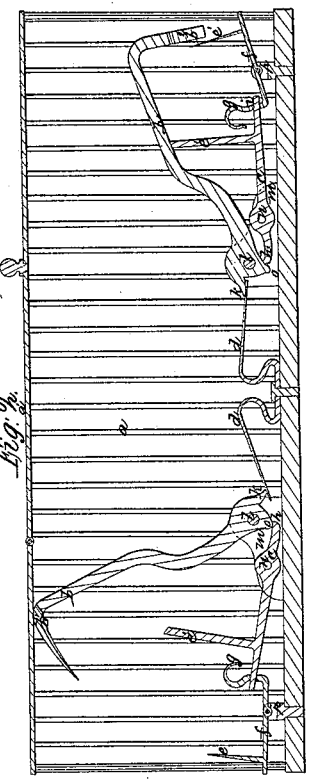
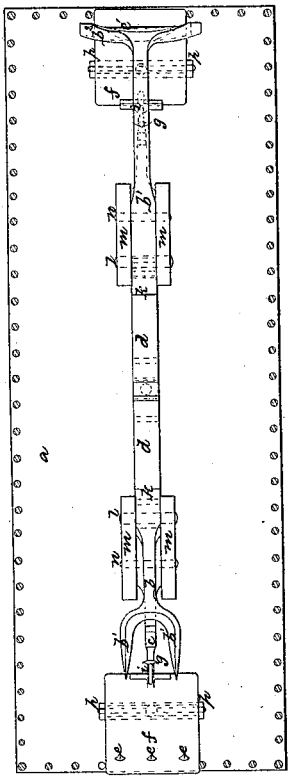
Witnesses.
Inventor.
John Liming

UNITED STATES PATENT OFFICE.

JOHN LIMING, OF PHILADELPHIA, PENNSYLVANIA.

IMPROVEMENT IN ANIMAL-TRAPS.

Specification forming part of Letters Patent No. 41,012, dated December 22, 1863.

*To all whom it may concern:*

Be it known that I, JOHN LIMING, of the city of Philadelphia, in the State of Pennsylvania, have invented a new and useful Improvement in Animal-Traps; and I do hereby declare that the following is a full, clear, and exact description of the construction and operation of the same, reference being had to the accompanying drawings, making a part of this specification, in which—

Figure 1 is a top view, Fig. 2 a central vertical longitudinal section, Fig. 3 a plan view, and Figs. 4 and 5 end elevations, of the said improved trap, like letters indicating the same parts when in the different figures.

The purpose of my said improvement is to insure a sufficient bleeding of such animals especially as are used for food, as well as to insure the capture and immediate death of any animal entering the trap.

It consists, substantially as hereinafter described and specified, in the peculiar construction and combined arrangement of a treadle in connection with a trigger and a striking-lever operating by a spring, the treadle being provided either with a knife or a series of spears or lances, and the lever with either a yoke or spears, operating together so as to instantly kill the animal, and also cause a free bleeding of the same, if desired for food.

In the drawings, $a$ is the body of the trap, $b$ the striking-lever, $c$ the trigger, $d$ the spring, and $f$ the treadle.

Both modifications of the front ends of the striking-lever and of the treadle are shown in the drawings, $b'$ being the spear form and $b^2$ the yoke form of the front or head end of the lever $b$, and $e$ being the spear form and $e'$ the knife form of the front part of the treadle $f$.

Fig. 4 and the left hand ends of Figs. 2 and 3 represent the lever, trigger, and treadle as "set;" and Fig. 5 and the right-hand ends of Figs. 2 and 3 represent the same parts as "sprung," or closed. The heel of the striking-lever has a projection, $k$, against which the spring $d$ presses as the motive power of the lever, the latter turning upon a pin, $l$, which is fixed across in two supports, $m\,m$, which are secured on the bottom of the trap $a$. The trigger $c$ also turns upon a pin, $n$, fixed in the two supports $m\,m$, and has a short hook, $h$, which catches upon a second projection, $o$, on the heel of the lever $b$, and holds the latter when in the raised or set position, as seen in the left-hand end of Fig. 2. On the upper side of the trigger $c$ there is an upright post, $c'$, against the upper end of which the lever $b$ is made to strike immediately after it is released entirely from the hook $h$, and forces the inner end of the trigger downward, as seen in the right-hand end of the same figure. The treadle $f$ is a broad flat piece, and turns upon journals which work in posts $p\,p$, secured to the bottom of the trap. The inner end of the treadle has a hooked upright, $g$, for holding the bait, and through the lower part of this upright there is a hole in which the front end of the trigger $c$ works loosely, and thus connects the two parts together, as seen in Fig. 2. Upon the front end of the treadle $f$ either the semicircular cutting-edge or knife $e'$, or the series of spears or lances $e\,e\,e$, are fixed perpendicularly thereto, and so as to come nearly opposite to the yoke or spears, as the case may be, in the striking-lever $b$ when the latter is sprung or forced down, as seen on the right hand in Fig. 2. Opposite to the head end of the lever $b$ there is an opening, $q$, (see Figs. 4 and 5,) left in the trap $a$ for the entrance of the fore part of the animal; and on the top of the trap there is a hinged lid, which on being raised admits the hand of the operator in "setting" the trap. Several of the series of devices, consisting of the lever, trigger, and treadle, may be arranged in the same trap, having an entrance opening to each.

Operation: An appropriate bait being fastened to the hook $g$ of the treadle $f$, the operator with one hand raises the lever $b$ sufficiently to allow the hook $h$ of the trigger $c$ to catch on the projection $o$ of its heel, when the treadle $f$ is pressed upward sufficiently by his other hand for the purpose, thus setting the trap, as represented in the left-hand end of Fig. 2. The animal seeking possession of the bait must pass its head over the front end of the treadle $f$ and place its fore feet upon the front end thereof, in order to seize the bait, and this proceeding tilts the front end of the treadle downward and elevates the front end of the trigger $c$, so as to release the striking-lever $b$, which, forced by the spring $d$, strikes powerfully downward, and, by means of its yoke $b^2$ or spears $b'$, as the case may be, puts an instantaneous end to the life of the animal, while at the same time the said lever *b* strikes upon the upper end of the upright piece *c'* of the trigger *c*, forces it downward, and thus suddenly drives upward the series of spears *e e e* or the cutting-edge *e'*, as the case may be, and sufficiently bleeds the animal to render the meat wholesome or marketable, if the same be of such an animal as may be desired for food.

This trap is simple in construction, easily set, not liable to get out of order in use, and is well adapted either for destroying verminous animals or for securing in a bled condition those which are suitable for food to man, and effects the object with perhaps the least possible amount of suffering.

I do not desire to confine myself to the use of both the yoke and the spears in the striking-lever and of the knife and the spears or lances in the treadle in the same trap, because either is intended to be used as the trap may be required for the different kinds of animals specified; but

Having thus fully described my improvement in animal-traps, what I claim as new therein of my invention, and desire to secure by Letters Patent, is—

The described arrangement and combination of the treadle *f*, the trigger *c*, and the striking-lever *b*, when the inner end of the said treadle *f* is loosely connected with the front end of the trigger *c*, and the said trigger *c* provided with an upright post, *c'*, against which the lever *b* strikes when released from the hook *h*, so as to cause the spear or knife end of the treadle *f* to be suddenly forced upward, as described, for the purpose specified.

JOHN LIMING.

Witnesses:
   BENJ. MORISON,
   W. H. MORISON.